United States Patent [19]

Yakata et al.

[11] 3,781,811

[45] Dec. 25, 1973

[54] MEMORY PROTECTIVE SYSTEMS FOR COMPUTERS

[75] Inventors: Akio Yakata, Kawasaki; Tsuneo Kinoshita, Ohme, both of Japan

[73] Assignee: Tokyo Shibauna Electric Co., Ltd., Kawasaki-shi, Japan

[22] Filed: Apr. 14, 1971

[21] Appl. No.: 133,983

Related U.S. Application Data

[63] Continuation-in-part of Ser. No. 759,146, Sept. 11, 1968, abandoned.

[30] Foreign Application Priority Data

Sept. 14, 1967 Japan .......................... 42/58968

[52] U.S. Cl. .......................................... 340/172.5

[51] Int. Cl. .......................................... G06f 9/00

[58] Field of Search ................................ 340/172.5

[56] References Cited

UNITED STATES PATENTS

| | | | |
|---|---|---|---|
| 3,377,624 | 4/1968 | Nelson et al. | 340/172.5 |
| 3,264,615 | 8/1966 | Case et al. | 340/172.5 |
| 3,328,765 | 6/1967 | Amdahl et al. | 340/172.5 |
| 3,321,747 | 5/1967 | Adamson | 340/172.5 |

*Primary Examiner*—Gareth D. Shaw
*Attorney*—George B. Oujevolk

[57] ABSTRACT

In a memory protective system for computers operable under master and slave modes which has a first register (denoted as a P register) storing information conducive to the determinatisn of an execution address of said master mode and a second register (denoted as a R register) storing information conducive to the determination of an execution address of said slave mode, the improvement comprising means for switching said second register to said first register when an information for changing the contents of said memory appears under said slave mode.

8 Claims, 6 Drawing Figures

INVENTORS

BY

INVENTOR

BY

INVENTOR.

BY

MEMORY PROTECTIVE SYSTEMS FOR COMPUTERS

CROSS-REFERENCE TO RELATED APPLICATION

This application is the Continuation-in-part of the U.S. Pat. application Ser. No. 759,146 filed on Sept. 11, 1968, now abandoned.

BACKGROUND OF THE INVENTION

This invention relates to an improved memory protective system for electronic computers.

The purpose of providing a memory protective system for electronic computers is to prevent mutual interference among operators, and to prevent damage to the system and hence to operators. See: Proceedings-Fall Joint Computer Conference, 1965, pages 205, 206, 593, 594 and 595. Memory protective systems for electronic computers include a system wherein words are limited in software fashion; and a number of protective systems utilizing hardware which can be outlined as follows. According to one system, an associated memory device is utilized to provide dynamic allocation whereby the state of an electronic computer at the time of executing an instruction is stored in a special register called a program status word. Core memories are divided into groups each consisting of 2K bits to form blocks and each block is provided with a protective key of 4 bits. The system is constructed such that writing in the memories is either enabled or prohibited depending upon whether the state of programming at the time is or is not matched with the protective key.

According to another system, a basic register is provided to store an effective region allocated to one program section. In other words, this system is so constructed that the basic register contains information on the region permitted to receive signals. In still another system, one memory plane is added to a core memory and one bit of an instruction word acts as a memory protective bit, thus providing memory protection for respective words. However, hardware utilized in these prior art systems is not only bulky and expensive but also leads to the increased cost of maintaining software, requiring memories to have an extremely large capacity. In the case where operators use words of assembler levels, the test run may be an interpretative run. However, operation of a batch system by the interpretative run means reduced speed. On the other hand, a free run requires minute care in exchanging systems for programs tested so that judgement can not be substituted by the results obtained by a software process. Accordingly, a memory protective system can not be used where all judgement is to be made by the software process. Further, memory protection should be carried out correctly irrespectively of an incorrect action or a mistake of the operator.

SUMMARY OF THE INVENTION

It is an object of this invention to provide a new and improved memory protective system for electronic computers in which memory protection can be provided by switching first and second registers related to the determination of the execution address and which is not only inexpensive and simple in construction but also can decrease the burden of software.

According to this invention, there is provided a memory protective system for computers wherein instructions contributing to the determination of the execution address are stored in a first and a second page registers; the control modes are determined as "master mode" and a "slave mode;" the first page register is utilized for the master mode while the second page register is utlized for the slave mode except an instruction to change the contents of the core memory; the second page register is switched to the first page register for the instruction to change the contents of the core memory; and, shift means are provided to shift the operation mode of the computer between the master mode and the slave mode. A page register is a field register where each block of a memory device is considered as or expressed as a page.

As used herein, the terms "master and slave modes" means a control system for computer operation. The master mode is a control system wherein a computer performs its function completely with respect to any instructions, whereas the slave mode is a system wherein an operation different from an operation to be originally performed is automatically carried out in response to to particular instructions, for example, an instruction to "write," an instruction to "interrupt."

Programs made by the user are generally carried out under the slave mode and sometimes called a "user's mode," while on the other hand, programs called "monitor" programs, wherein several programs are monitored, are carried out under the master mode and alternatively called a "monitor mode." In the monitor (master mode), therefore, all the functions of computers can be utilized. In the user's mode (slave mode), however, the function of the computers is restricted only the operations allowed by the monitor.

As the type of computer operated under the master and slave modes, the following types may be listed by way of example.

1. IBM 360/67
2. GE 635
3. GE 645

A unit representative of one block of a memory device is called a "page," and a register used in conjunction with the page or corresponding to a page is called a "page register." The memory device is divided into a plurality of blocks — each called a "page" in each of which a plurality of work tasks are memorized in such a manner that they do not interfere with each other. In this type of arrangement, when address information representative of each block (page) is applied to the page register, any desired page is identified. In the present invention, page registers P and R are employed in the control of the master and slave modes. That is to say, the page register P is used in the program run under the master mode, whereas the page register R is employed in the program run under the slave mode.

Suppose, for example, that computers operated under master and slave modes are jointly used in "time sharing" system by many users. In this case, programs performed under the master mode are called a "monitor," and monitors are provided for several programs. Then, user's own program prepared in the slave mode basis can be performed under the control of the master mode. Since a memory device has the memory contents of many users concurrently memorized therein, the possibility exists that during the execution of one user's program under the slave mode, the other user's program is modified or destroyed.

However, according to the present invention, when the contents of a memory device are modified in the case of, for example, the write-in operation, then the page register P is, of necessity, operated without the use of any page register R usually employed under the slave mode, thus preventing one user's program from being destroyed by the other's program. To this end, there is provided, for example, at the preceding stage of the page registers P and R, a logical circuit illustrated in FIG. 5. The logical circuit is so arranged that when an instruction to modify the contents of the memory device is applied in the slave mode basis, the instruction is necessarily applied to the page register P.

In the computer of the present invention, the instructions herein defined as SP, SX, SM, SS and T-type instructions are used in the paging operation.

SP INSTRUCTION (SET PAGE)

This is an instruction to set a page register. Under the master mode an operand value is set in the register P, whereas under the slave mode an operand value is set in the register R.

SX INSTRUCTION (EXCHANGE)

This is an instruction to effect an exchange of a value corresponding to a "lower five bits" portion between the page register and the accumulator. Namely, the content of the page register is read out into the accumulator. An exchange of the value is effected, when under the master mode, between the accumulator and the page register P: and when under the slave mode, between the accumulator and the page register R.

SM INSTRUCTION (SET MASTER)

This is an instruction to set into the register a "lower five bits" portion of the content of the accumulator. Under the master mode, when the tag of the SM instruction is O, it is set into the page register P. On the other hand, when tag of the SM instruction is I, then it is set into the page register R.

SS INSTRUCTION (SET SLAVE)

This is an instruction to set the value of an operand, under the prevailing master mode, into the page register R and to make preparation for transfer to the slave mode. The actual transfer to the slave mode is effected at the time when a jump instruction (i.e., a jump instruction with indirect modifier) appearing subsequent to an SS instruction is executed.

Under the prevailing slave mode, the value of an operand is merely set into the page register R and again maintained under the slave mode.

T-TYPE INSTRUCTION (CHANGE MEMORY)

This is an instruction for changing the contents of the core memory.

DESCRIPTION OF THE PREFERRED EMBODIMENT

Figure 1:
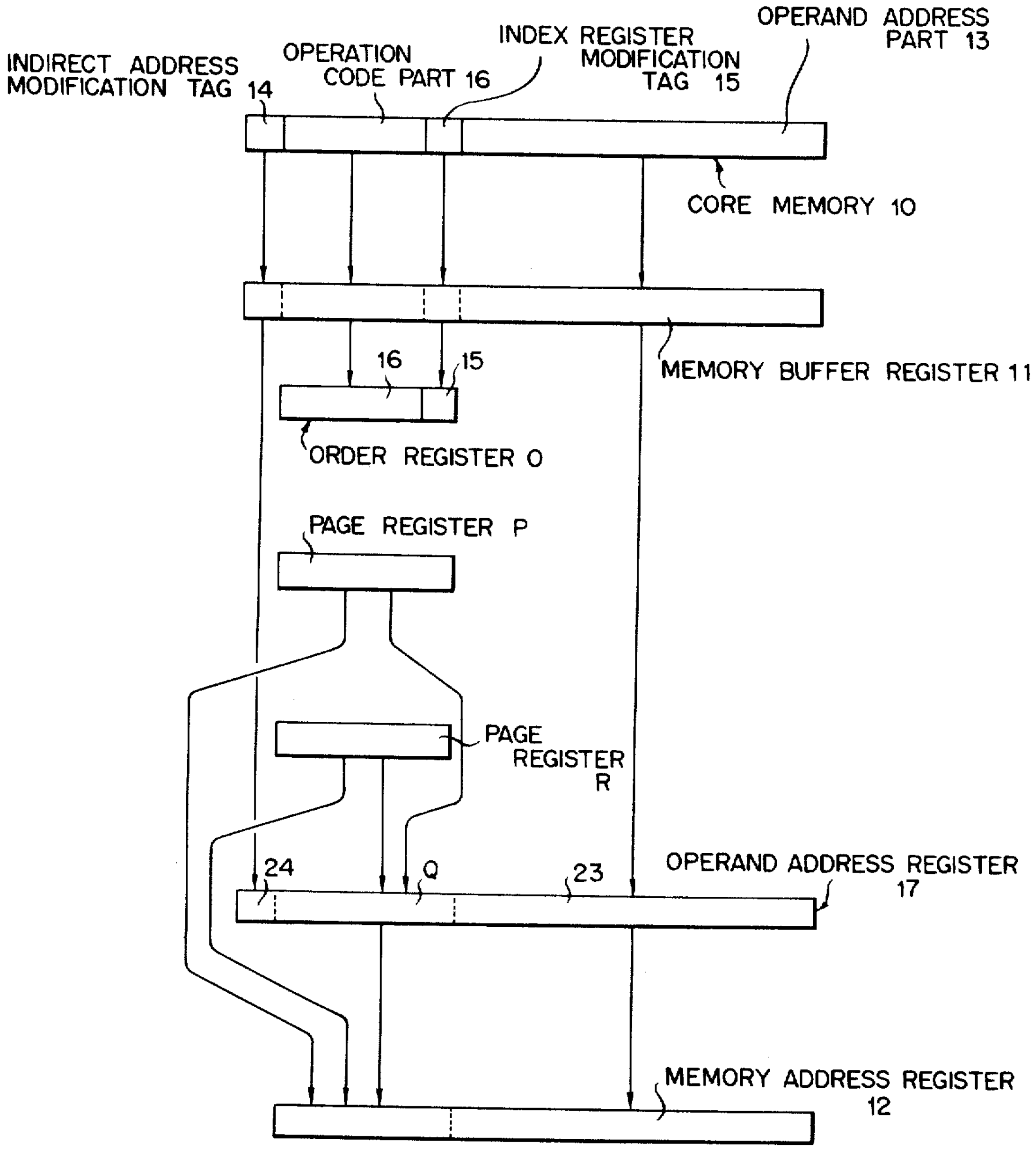
FIG. 1 is a block diagram of a memory protective system embodying the principle of this invention.

FIG. 1 explains the operation format of an embodiment of this invention in which a full operand type instruction consisting of 16 bits is read out into a memory buffer register 11 associated with a core memory 10 to be combined with two page registers P and R, each consisting of five bits to form an execution address of 15 bits on a memory address register 12.

In the case of the full operand type, an instruction word in a core memory comprises an instruction together with an operand address consisting of 10 bits, an indirect address modification tag 14, an index register modification tag 15 and an operation code part 16 consisting of four bits.

The instruction read out into the memory buffer register 11 is shifted to an order register O whose parts 15 and 16 respectively consisting of five bits and the operand address part 13 are shifted to the least significant part 23 of 10 bits of the operand address register 17 consisting of 16 bits whereas the indirect address modification tag 14 is shifted to the most significant part 24.

Specification or designation of a portion Q of five bits on the operand address register 17 is performed by shifting the contents in page registers P and Q to specify a segment designated by "Page" in the core memory 10.

Figure 2:
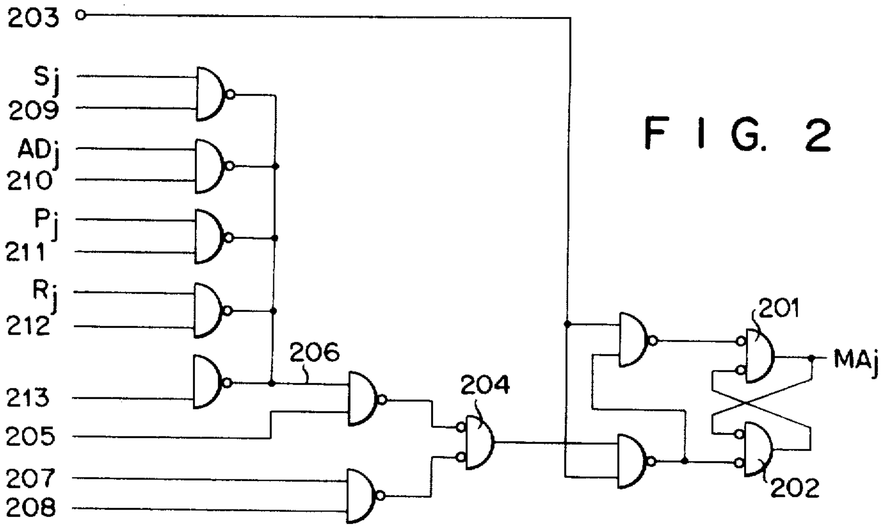
FIG. 2 shows a logical circuit adapted to set a specified content in a memory address register that specifies the address in the core memory included in the embodiment shown in FIG. 1.

FIG. 2 shows a manner of setting the specified content in the memory address register 12 that specifies the address in the core memory 10.

NAND circuits 201 and 202 comprising a certain bit on the memory address register 12 operate to shift and hold an output from NAND circuit 204 to NAND circuit 202 of the memory address register 12 when a shift pulse is applied to an input terminal 203.

When a condition is given to an input terminal 205 that the computer should use core memories, the output from the NAND circuit 204 operates to transmit a wired AND signal 206 whereas when a condition is given to an input terminal 207 that the data channel should use core memories the output operates to transmit the signal applied to an input terminal 208.

Then the wired AND signal 206 acts to transmit a bit Sj on a sequence control counter when the input terminal 209 is enabled, transmit a bit ADj on the operand address register 17 when an input terminal 210 is enabled, transmit a bit Pj on the page register P when an input terminal 211 is enabled, transmit "1" to MAj when an input terminal 213 is enabled whereas to transmit "O" to MAj when all input terminals 209, 210, 211, 212 and 213 are not enabled.

According to this embodiment, when the indirect address modification tag 14 is specified the operation of replacing the content of the operand address register 17 with 16 bit content of an address of 15 bits consisting of Q and part 23 in FIG. 1 is continued until the content of the most significant part 24 is reduced to zero. Thereafter upon receiving a specification for index register modification tag 15, the content of the index registers is added to the content of the operand address register 17 at that time to determine an execution address consisting of 15 bits.

Figure 3A:
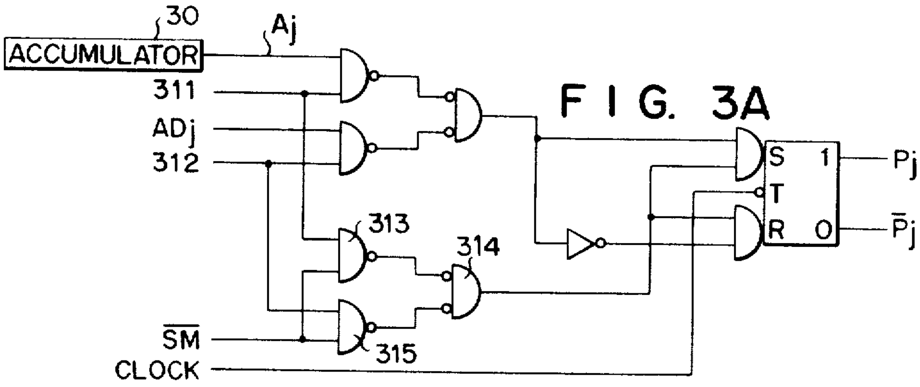
FIGS. 3A and 3B show a logical circuit to shift the contents of two page registers of the embodiment shown in FIG. 1.

More particularly, as shown in FIG. 3A, when an execution signal of an SX instruction is applied to an input terminal 311, the page register P operates to shift the bit content Aj on the accumulator 30 to output Pj on the page register via NAND circuits 314 and 313 when $\overline{SM}$ = 1 or when the system is operating in the master mode. On the other hand, when an execution signal of SP instruction is applied to an input terminal 312, the bit content ADj on the operand address register 17 is shifted to output Pj on the page register similarly through NAND circuits 315 and 314 only when the system is operating in the master mode.

Figure 3B:
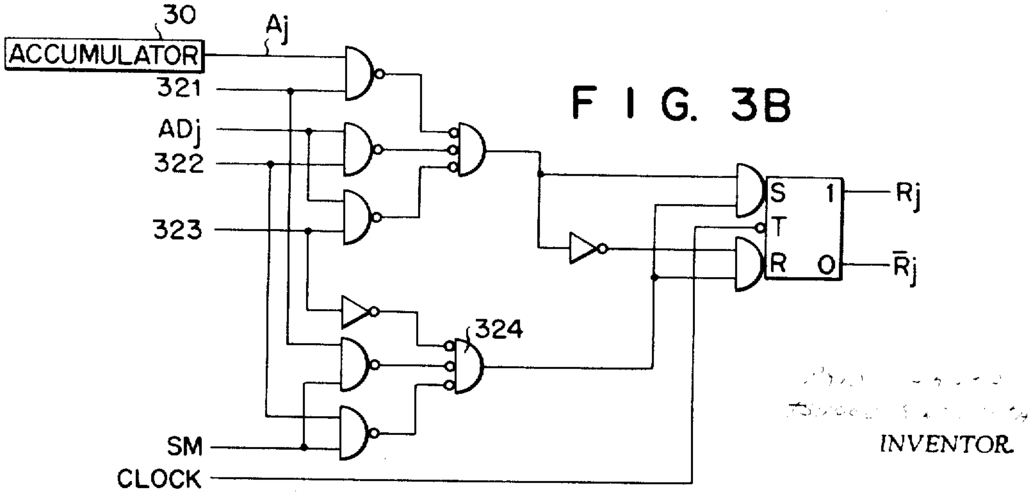

Referring now to FIG. 3B, when an execution signal of an SX instruction is transmitted to input terminal 321, the page register R operates to shift the bit content Aj on the accumulator 30 to Rj on the page register by the output of the NAND circuit 324 when SM = 1 or when the system is operating in the slave mode. Likewise, when an execution signal of SP instruction is transmitted to an input terminal 322 the bit content ADj of the operand address register 17 is shifted to Rj on the page register only when the system is operating in the slave mode. Further when an execution signal of an SS instruction is applied to an input terminal 323 the bit content ADj on the operand address register 17 will be shifted to Rj on the page register irrespective of the mode.

Two modes, i.e., master and slave modes of operation are established in the control inside a computer. The mode which had been prevailing from before is termed as the master mode in which case only P is used as the page register. The other condition is termed as the slave mode in which case only R register is used as the page register and the transfer from the master mode to the slave mode is effected by a command termed as SS instruction.

With the slave mode, it is impossible to change the content of the page register P so that to determine the execution address the page register R is used and the part Q of the operand address register 17 shown in FIG. 1 is substituted by the content of the page register P only when it is desired to vary the content of the core memory 10.

The instruction for writing is so constructed that, with the master mode, modification of the page registers is made to determine the execution address, whereas with the slave mode, while memory cycles are being utilized for writing, the execution address already established in the address register is varied so as to result in a similar modification of the page register P. In this manner, with the slave mode, when determining the execution address the page register R is modified by means other than the write instruction and the write operation is limited to a range specified by the page register P.

On the other hand, when interrupted by the control, the operation mode is switched to the master mode. An SS instruction (set slave mode and R register) is generated when writing is not permitted to switch the operation from the master mode to the slave mode. The SS instruction comprises two parameters, the first parameter representing the discrimination as to whether the content of page register R should be changed or reserved, and the second parameter representing the content of the page register R.

Figure 4:
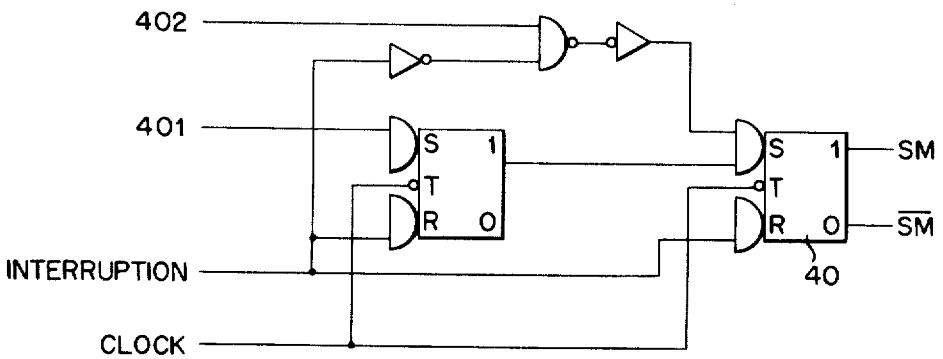
FIG. 4 is a logical circuit adapted to effect shifting between master and slave modes of the embodiment shown in FIG. 1.

FIG. 4 shows a logical circuit that discriminates the master mode and the slave mode. When an interruption occurs, a flip-flop 40 is reset and thereafter the operation becomes the master mode. Subsequent to the application of a signal for executing the SS instruction to input terminal 401 when input terminal 402 receives a signal representing the fact that a jump instruction J has been executed through indirect modification, flip-flop 40 will be set to change to the slave mode.

Page registers P and R are employed in such a manner that under the master mode the page register P can be specified and employed but the page register R can be specified but can not be used whereas under the slave mode the page register R can be specified and employed but the page register P can be used but can not be specified with reference to the write instruction. It is to be understood that under the slave mode all orders for stopping control including interrupting relation, incoming and outgoing relation, SS instruction, source ON and OFF instruction, stop, hold, etc. are substituted by no operation instruction. Where it is desired to perform these order operations a supervisor operating under the master mode is caused to set a monitoring program in the page register P. As used herein term "supervisor" means a program operated under the master mode which is used to rewrite the page register P to carry out the memory protection of programs operated under the slave mode.

When an order is provided to switch from the slave mode to the master mode, an XN instruction is prepared to produce an interruption. This XN instruction comprises two parameters, one discriminating whether the interrupted addresses are the same or different addresses and the other representing the argument from the slave mode to the master mode where the interrupted addresses are the same but representing the suffix thereof where interrupted addresses are different. Thus by constructing a program from units each including 1K words (which is equal to one page in this embodiment) memory protection for page units can be provided by switching page registers P and R utilized for determining the execution address.

Figure 5:
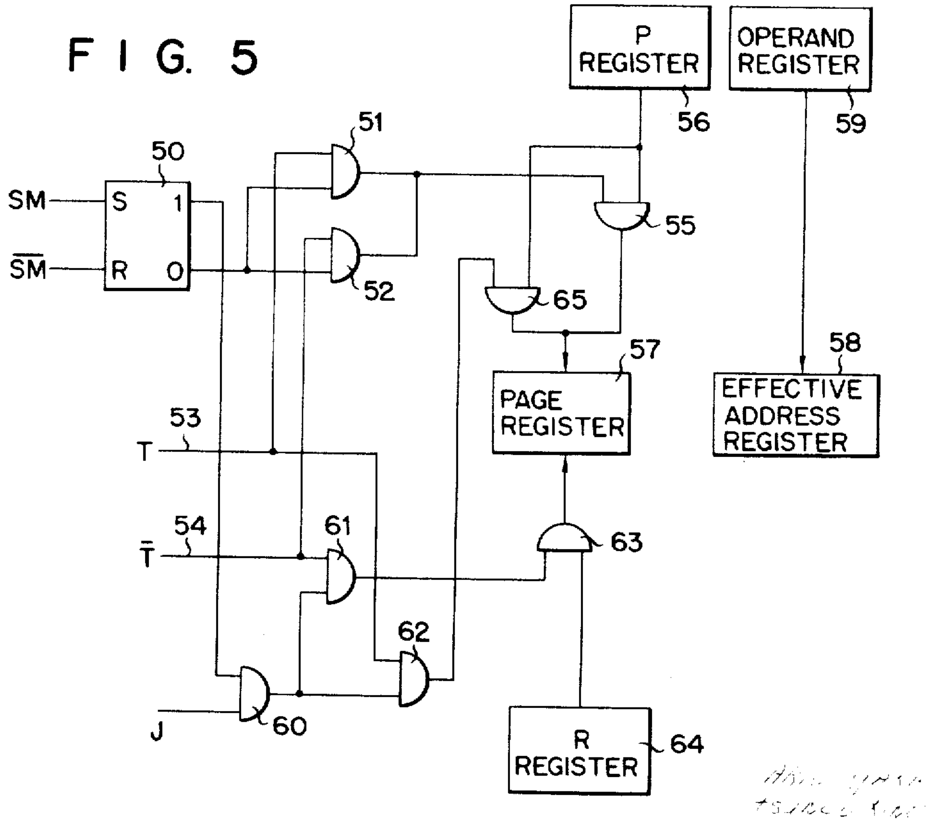
FIG. 5 is a logical circuit of the embodiment of this invention.

Referring to FIG. 5, when output signal $\overline{SM}$ from the flip-flop circuit 40 of FIG. 4 is supplied to the reset input terminal of the flip-flop circuit 50, then there is drawn out output from the zero output terminal of said flip-flop circuit 50 to be supplied to the AND gates 51 and 52, causing the computer to be operated in master mode. Said AND gates 51 and 52 are supplied with T- and $\overline{T}$-type instructions at the terminals 53 and 54. When the AND gate 51 is supplied with T-type instruction or when the AND gate 52 is supplied with $\overline{T}$-type instruction, the resultant output is conducted to a gate 55 to open it, causing the contents stored in a P register 56 to be supplied to a page register 57. In the case of master mode, the P register 56 is already supplied with the contents Aj of the accumulator 30 as described in connection with FIG. 3A. Said contents Aj are supplied through the AND gate 55 to a page resistor 57 so as to determine an execution address for the page used in master mode operation. Said page register 57 is coupled with an effective address register 58 for defining an effective address on the page P specified by said page register 57. The effective address register 58 is supplied from an operand register 59 with address information required to determine an effective address. Address information supplied to the registers 57 and 58 is carried to the memory address register 12 of FIG. 1, causing the computer to be operated according to the program stored in that address of the core memory which is specified by said memory address register 12.

For the slave operation of the computer which has been actuated in the master mode, there should first be given interruption instruction as described by reference to FIG. 4, to cause the flip-flop circuit 40 to be set and the SM output therefrom to be conducted to the set terminal of the flip-flop circuit 50. When said set terminal is supplied with SM signals the flip-flop circuit 50 is set to close the AND gates 51 and 52. Set output from the flip-flop circuit 50 is carried to an AND gate 60, which has already been supplied with jump instruction J. Since output from the AND gate 60 is supplied together with T- and $\overline{T}$-type instructions to AND gates 61 and 62, conversion from the master to the slave mode is only effected when the flip-flop circuit 50 is set to give the jump instruction J.

Where, under the condition thus converted to the slave mode, there is given $\overline{T}$-type instruction, that is, instruction to prevent the contents of one memory from being changed, then output from the AND gate 61 is carried to an AND gate 63 to cause the contents stored in an R register 64 to be supplied to the page register 57. In the case of said slave mode, the contents Aj of the accumulator 30 are already shifted to the R register 64 as described in connection with FIG. 3B so as to determine an execution address for the page used in the slave mode. The effective address register 58 is supplied in the slave, as well as in the master mode with the required address information from the operand register. Thus the effective address of the core memory is designated, causing the computer to be operated according to the program stored in the memory.

When T-type instruction is supplied to the terminal 53, output from the AND gate 62 is carried to an AND gate 65, through which there are conducted the contents of the P register 56 to the page register 57. The succeeding operation is the same as in the case of the master mode.

According to this invention, when there is given T-type instruction in a slave mode operation, the contents of the P register 56 never fail to be supplied to the page register 57, so that there is effected good memory protection in the slave mode, that is, the user's mode without causing the user's program to be changed even when there is supplied the T-type instruction.

What we claim is:

1. In a memory protective system for computers operating in the master mode and slave mode, in combination:

a. a memory buffer register (11) into which an operand instruction consisting of a series of bits is written;

b. a core memory (10) coupled to said memory buffer register (11) for transmitting bits defining addresses and instructions;

c. first and second page registers (P), (R) each consisting of a plurality of bit defining means, a memory address register (12) coupled to said first and second page registers (P), (R);

d. an operand address register coupled to said memory buffer register (11) said first and second page registers (P), (R) and said memory address register (12); and, e. logic control mode transfer means coupled to said memory address register (12) and to said first and second page registers (P), (R) for enabling said first page register (P) under a master mode and for enabling said second page register (R) under a slave mode and switching means for switching the contents between said second register and said first register when an instruction for changing the contents of said memory appears under said slave mode.

2. A memory protective system according to claim 1 wherein said control mode transfer means includes a flip-flop circuit which is reset to switch the control to said master mode when an interruption instruction is generated and set to switch the control to the said slave mode when there is produced a signal indicating that a jump order has been executed by indirect modification subsequent to the transmittal of the execution of an order to set the operand of the master mode into the first register and prepare to transfer to the slave mode.

3. A computer memory protective system according to claim 1, said control mode transfer means including an accumulator wherein said first register switching means includes first and second NAND circuits with first and second input terminals which function to shift a bit content in said accumulator to said first register when the control mode assumes the master mode and when a signal for executing an order reading out of the content of said register into said accumulator is transmitted to said first input terminal and an operand address register with a third and the second NAND circuits which function to shift a bit content of said operand address register to said first register when the control assumes the master mode and when a signal for executing an order to set a register is transmitted to said second input terminal.

4. A memory protective system according to claim 1, said control mode transfer means including an accumulator and an operand address register wherein said switching means includes a NAND circuit with first and second input terminals which operates to shift a bit content on said accumulator to said second register when the operation assumes the slave mode and when a signal for executing an order reading out the content of said register into said accumulator is transmitted to said first input terminal, and to shift a bit content on said operand address register to a defined position on said second register when a signal for executing an order to set a register is transmitted to said second input terminal.

5. A memory protective system for computers which are controlled in master mode and slave mode, comprising: a memory; a first flip-flop coupled to said memory which is set in the slave mode and reset in the master mode, a first input terminal to said memory for receiving a first instruction for changing the contents of said memory, a second input terminal to said memory for receiving an inverted instruction of said first instruction, first and second registers coupled to said memory respectively storing information as to the determination of an execution address, a logic circuit coupled to said first and second registers for utilizing said second register under said master mode, utilizing said second register under said slave mode and switching said second register to said first register when said first instruction appears on said first input terminal under said slave mode.

6. In a memory protection system for protecting the contents stored in a memory device on an electronic computer which is operated in master and slave modes, the improvement comprising: a first register for storing first address information conducive to the determination of an execution address of said master mode; a second register for storing second address information conducive to the determination of an execution address of said slave mode; a page register coupled to said first and second registers; means for selectively applying to said page register, said first address information under said master mode and said second address information under said slave mode, means for applying said first address information to said page register when an instruction for changing said contents stored in said memory device appears under said slave mode.

7. A memory protection system for protecting contents stored in a memory device of an electronic computer which is operated in master and slave modes, the improvements comprising: a flip-flop circuit in said system which is set in said slave mode and reset in said master mode; a first register storing first address information conducive to the determination of an execution address of said master mode; a second register storing second address information conducive to the determination of an execution address of said slave mode; a page register coupled to said first and second registers for selectively storing said first and second address information; a first AND gate receiving the reset output of said flip-flop circuit and a first instruction for changing said contents stored in said memory device; a second AND gate receiving the reset output of said flip-flop circuit and a second instruction preventing said contents from being changed; a third AND gate receiving the set output of said flip-flop circuit and an instruction to jump; a fourth AND gate receiving said second instruction and an output of said third AND gate; a fifth AND gate receiving said first instruction and the output of said third AND gate; a sixth AND gate receiving the output of said fourth AND gate and said second address information; a seventh AND gate receiving the outputs of said first and second AND gates and said first address information, an eighth AND gate receiving the output of said fifth AND gate and said first address information, the output of said sixth AND gate and the outputs of said seventh and eighth AND gates being connected to the input of said page register.

8. A memory protection system according to claim 7 further comprising means for producing signals to selectively set or reset said flip-flop circuit, said signal producing means having a first and second input terminals and a second flip-flop circuit which is reset when an interruption signal is supplied to the reset terminal of said second flip-flop circuit and produces a signal to reset said flip-flop circuit, and is set when said first input terminal receives a signal for executing a Set Slave instruction and when said second input terminal receives a signal representing the fact that a jump instruction has been executed through indirect modification.

* * * * *